United States Patent [19]

Kobayashi

[11] Patent Number: 5,737,630

[45] Date of Patent: Apr. 7, 1998

[54] COMMUNICATION DEVICE FOR SYNCHRONIZED SERIAL COMMUNICATION

[75] Inventor: Masayuki Kobayashi, Anjo, Japan

[73] Assignee: Nippondenso Co., Ltd., Kariya, Japan

[21] Appl. No.: 515,571

[22] Filed: Aug. 16, 1995

[30] Foreign Application Priority Data

Sep. 20, 1994 [JP] Japan .................................. 6-225227

[51] Int. Cl.$^6$ .................................................. G06F 13/00
[52] U.S. Cl. ........................... 395/800.29; 395/200.38; 364/132; 364/230.4; 364/DIG. 1
[58] Field of Search ........................ 395/800, 181, 395/200.05, 800.29, 800.31, 200.38; 364/132, 230.4, DIG. 1

[56] References Cited

U.S. PATENT DOCUMENTS

| 4,825,362 | 4/1989 | Minami et al. ............... 395/200.13 |
| 5,109,329 | 4/1992 | Strelioff ........................... 395/734 |
| 5,587,573 | 12/1996 | Owen et al. ...................... 235/380 |

FOREIGN PATENT DOCUMENTS

| 62-39929 | 2/1987 | Japan . |
| 63-257356 | 10/1988 | Japan . |
| 4-358230 | 12/1992 | Japan . |

Primary Examiner—John E. Harrity
Attorney, Agent, or Firm—Cushman Darby & Cushman IP Group of Pillsbury Madison & Sutro LLP

[57] ABSTRACT

In order to shorten time needed for communication and alleviate the processing load of the handshake procedure, a master CPU and a slave CPU perform an exchange of data utilizing a first data line and a second data line. A key word is entered in a communication message to the master CPU from the slave CPU requesting initialization be performed. An initialization request from the slave CPU to the master CPU is performed with a key word accompanying a communication error from the slave CPU. The master CPU initializes the slave CPU and synchronizes with it by utilizing a request line, and a reply line only when the master CPU power is turned on or when a communication error occurs including the request for initialization by means of the key word.

17 Claims, 8 Drawing Sheets

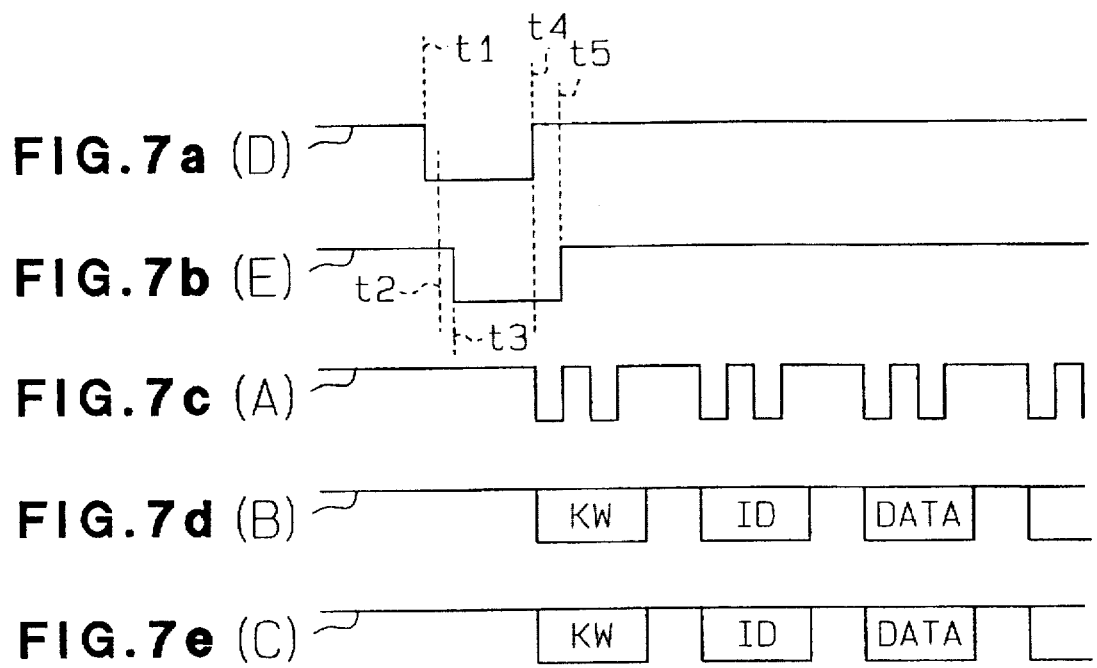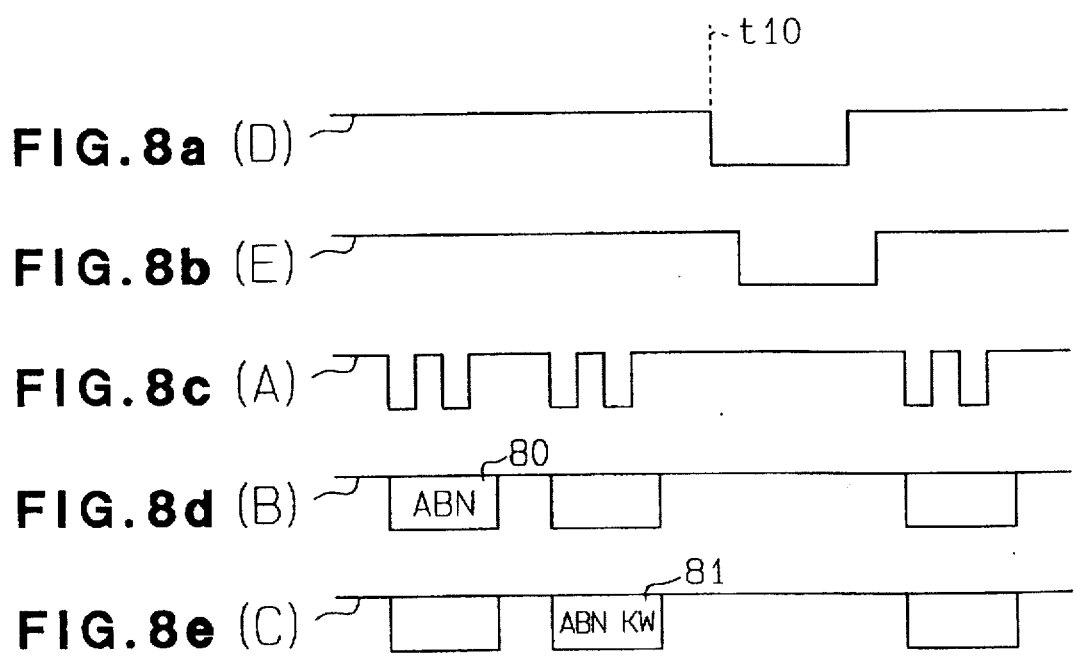

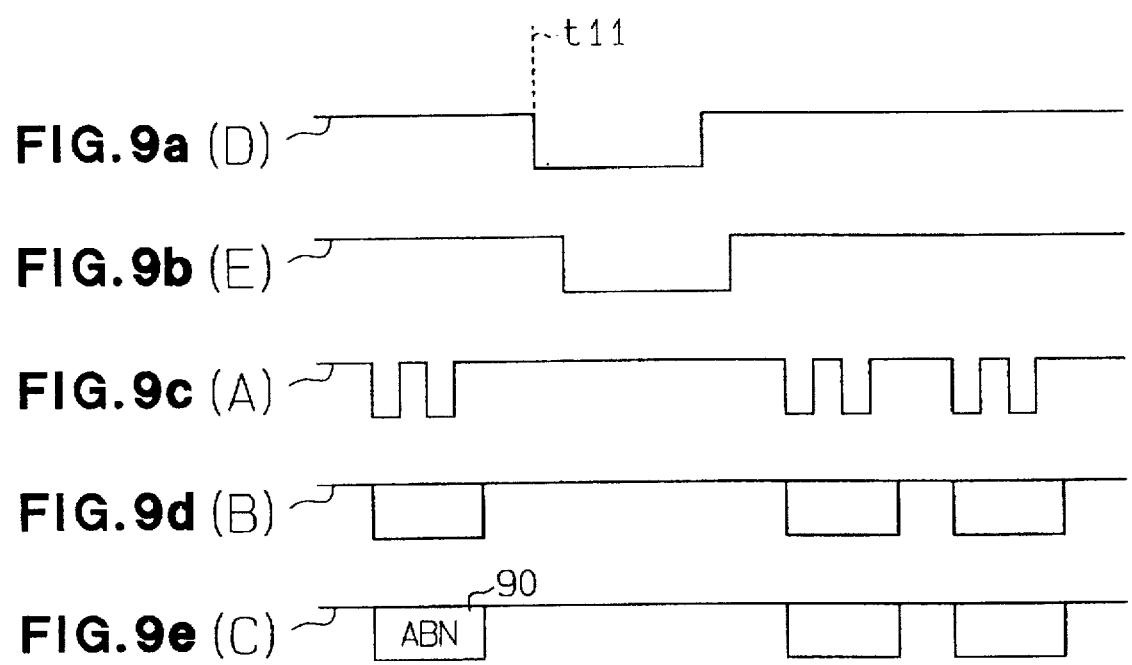

PRIOR ART  READY

PRIOR ART  BUSY

PRIOR ART  DATA 5,737,630

COMMUNICATION DEVICE FOR SYNCHRONIZED SERIAL COMMUNICATION

CROSS REFERENCE TO RELATED APPLICATION

This application is based on and claims priority of Japanese Patent Application No. 6-225227 filed on Sep. 20, 1994, the content of which is incorporated herein by reference.

BACKGROUND OF THE INVENTION

1. Field of the Invention

This invention relates to a communications device and a communication method generally and relates in particular to a communications device for carrying out synchronized serial communication between a master CPU and a slave CPU.

2. Description of Related Art

Conventionally, for instance in engine control systems, data communication is carried out between CPUs utilizing a plurality of CPUs to regulate the engine operation. In such cases, a code-independent message is issued by means of DLE as a method for synchronizing serial data communication between CPUs. This method is standard R646 in ISO (International Organization for Standardization) and used as a basic data transfer control procedure for maintaining the independence of a message control signal. More specifically, in this method, DLE is also inserted prior to a control symbol (for instance SOH; Start Of Heading) to prevent the control symbol and data from coinciding and for allowing errors in the beginning of the message to be detected (DLE is coded as DLE+DLE).

However this method cannot be employed for the following reasons. When a value identical to DLE is present in the communications data, one byte of DLE must be expressed as two bytes of DLE+DLE, and the message does not have a fixed overall length. Because the immediately prior data must be stored for the beginning of the control symbols and for converting DLE into DLE+DLE and data must be formed by means of a relation with the prior data, this method cannot be used in systems communicating with hardware having a fixed byte length. Further, programs such as those for processing the beginning of the code symbol are complicated and a RAM is needed to hold the immediately prior data.

Whereupon, as a master/slave type synchronized serial communication method, a handshake was performed to synchronize the master and the slave, upon each serial communication, by the use of a custom line other than the serial communication line. For instance, as shown in FIG. 10, the master CPU 100 and the slave CPU 101 are connected by a READY line, a BUSY line, and DATA lines. As shown in FIGS. 11a through 11c when the master CPU 100 outputs the READY signal, and when the master CPU 100 is applied with the BUSY signal, the handshake is performed each time data is produced.

However this method has a drawback in that, since the custom communication lines (READY line, BUSY line) must be controlled to attain the handshake for each data communication, a large processing load was imposed on the software because of greatly increased communication time and the need for the handshake procedure.

SUMMARY OF THE INVENTION

In consideration of these problems, an object of this invention is to provide a communication device to shorten the time needed for communication and to alleviate the processing load of a handshake procedure.

According to this invention, an initialization request is made to a master CPU from a slave CPU by means of an initialization request code, when a communication error occurs in the slave CPU. The master CPU thereupon initializes the slave CPU and synchronizes with it by utilizing a request line and a reply line only when the master CPU is initialized by power being turned on, and when a communication error occurs including the request for initialization by means of the initialization request code. As a consequence, the frequency of use of the reply line and request line is reduced and initialization can be performed.

The initialization request code is preferably placed at the front of the communication message so that the initialization request code will be read out at an early stage of the message and countermeasures taken at an early stage.

The communications message is even more preferably segmented into units longer than the number of bits comprising the initialization request code, and sent. The initialization request is detected by the master CPU on receiving the initialization request code, and countermeasures taken at an early stage.

BRIEF DESCRIPTION OF THE DRAWINGS

In the accompanying drawings:

FIGS. 3a and 3b are specific examples of message formats in which FIG. 3a in particular shows a water temperature data while FIG. 3b shows a throttle opening data;

FIGS. 7a through 7e are timing charts showing the operation at initialization when a power is turned on;

FIGS. 8a through 8e are timing charts showing pulse timings when an abnormality has occurred in a communication message from the master side to the slave side;

FIGS. 9a through 9e are timing charts showing pulse timings when an abnormality has occurred in a communication message from the slave side to the master side;

DETAILED DESCRIPTION OF THE PREFERRED EMBODIMENT

An embodiment of this invention is explained while referring to the accompanying drawings.

Figure 1:
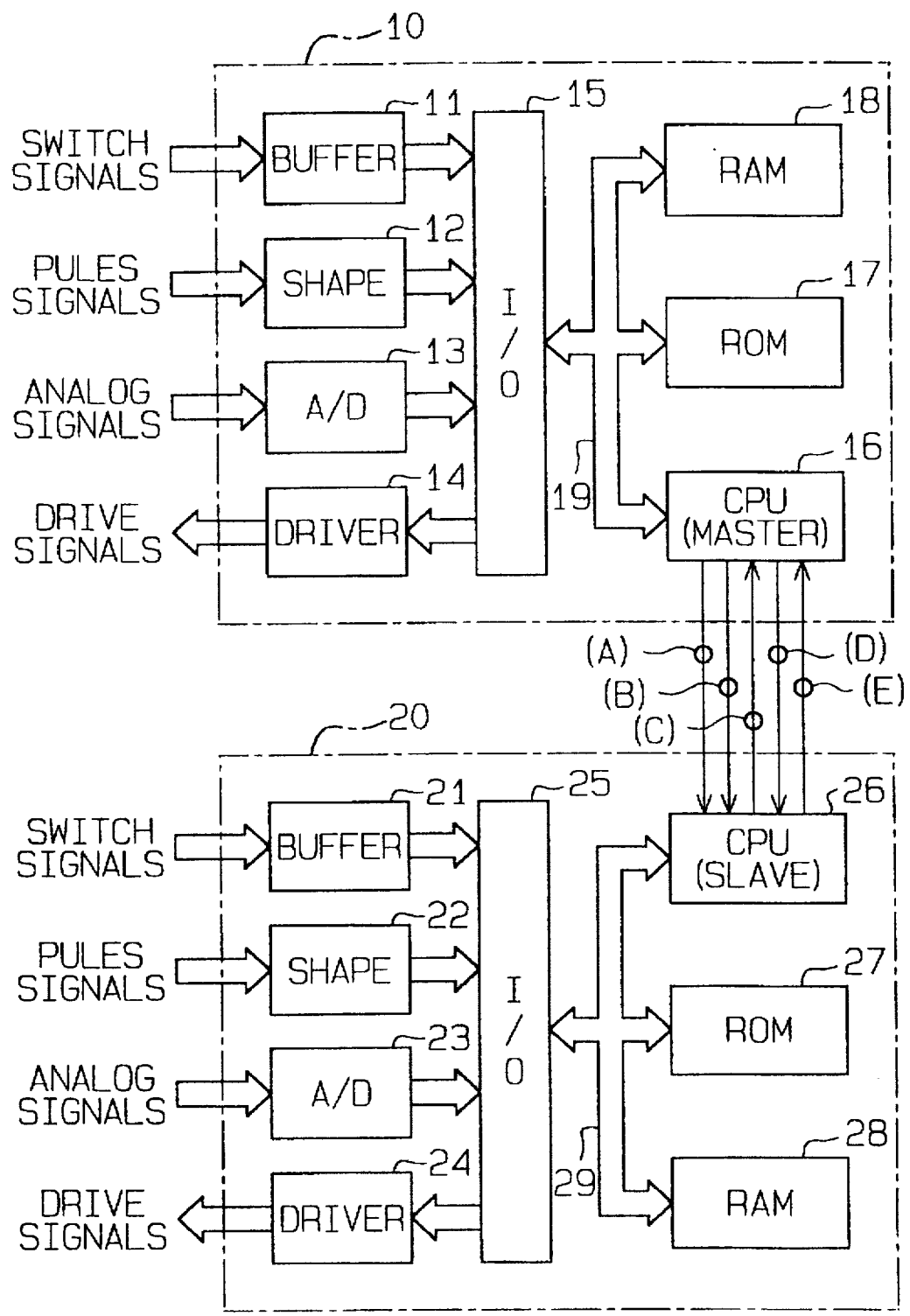
FIG. 1 is a block diagram showing the structure of a vehicular engine controller according to an embodiment of the invention.

FIG. 1 is a block diagram showing the structure of a vehicular engine controller according to this embodiment. As shown in FIG. 1, the vehicular engine controller in this embodiment includes an electronic controller unit (hereafter ECU) 10 which performs a fuel injection control, an idle speed control, a fuel pump control, a valve control, a charge pressure control, and a breakdown diagnostics control, and an electronic controller unit (hereafter ECU) 20 which performs a throttle valve opening control, an ignition timing control, a knock suppression control, and a charge pressure control, etc.

The electronic controller unit ECU 10 is comprised of an input buffer 11, a waveform shaping circuit 12, an A/D converter 13, an output driver 14, an I/O port 15, a CPU (master) 16, a ROM 17 and a RAM 18. Switch signals such as from a start switch, or clutch switch are applied to the buffer 11. The waveform shaping circuit 12 receives pulse signals from the rpm (speed) sensor, and cylinder discriminator sensor and shapes received waveforms. The A/D converter 13 is applied with analog signals detected by the sensors, and converts the analog signals into digital signals. The output driver 14 produces drive signals for fuel injection valves and an idle speed control device, etc. The I/O port 15 connects the input buffer 11, the waveform shaping circuit 12, the A/D converter 13, and the output driver 14. The I/O port 15, the CPU 16, the ROM 17, and the RAM 18 are mutually connected by a bus 19.

The switching signals and sensor signals are applied to the CPU 16 by way of the I/O port 15 and processing is performed for controlling the engine. Drive signals are sent from the output driver 14. Programs and data for processing by the CPU 16 are stored beforehand in the ROM 17. Data is temporarily stored in the RAM 18 when processing is to be performed by the CPU 16.

In the CPU 16, an engine coolant signal from the engine coolant sensor is input by the A/D convertor 13. By means of the engine coolant signal and communication signal processing, and based on throttle open setting data sent from the ECU 20, the amount of fuel injection is calculated and sent by way of the output driver 14 to the fuel injector.

Just as with ECU 10, the ECU 20 is comprised of an input buffer 21, a waveform shaping circuit 22, an A/D converter 23, an output driver 24, an I/O port 25, a CPU (slave) 26, a ROM 27, and a RAM 28. The I/O port 25, the CPU 26, the RAM 27, and the RAM 28 are mutually connected by a bus 29.

The ECU 20 along with inputting switch signals, pulse signals and analog signals, as done in the ECU 10, also outputs various drive signals to the actuators. The CPU 26 is applied with an acceleration amount signal from an acceleration sensor by way of the A/D converter 23. Because of communication signal processing and based on engine coolant temperature data sent from ECU 10, a throttle valve opening is calculated from the acceleration amount. The output driver 24 then drives a throttle actuator (for instance a stepping motor) to open the throttle valve to the calculated required amount.

The CPU 16 and the CPU 26 have a communication function allowing mutual data communication by means of synchronized serial communication (SPi), and a standard timing line for controlling message synchronization in both directions.

In this embodiment, the CPU 16 is defined as the master CPU, and the CPU 26 is defined as the slave CPU. The CPU 16 and the CPU 26 are connected with a custom clock signal line A for supplying a communication clock signal from the master to the slave, a data line B (first data line) for transmission of digital data from the master to the slave, a data line C (second data line) for transmission of digital data from the slave to the master, a basic timing request line D from the master to the slave for requesting initialization of communication, and a basic timing reply line E, from the slave to the master for indicating initialization is complete.

The SPi performs serial communication of standard length bytes without software processing between the CPU 16 and the CPU 26. The basic timing request line D and the basic timing reply line E are control lines for synchronizing communication between master and slave when the power is turned on, or when the communications message from the slave to the master is abnormal, and also when the communication message from the master CPU to the slave CPU is abnormal.

Figure 2:
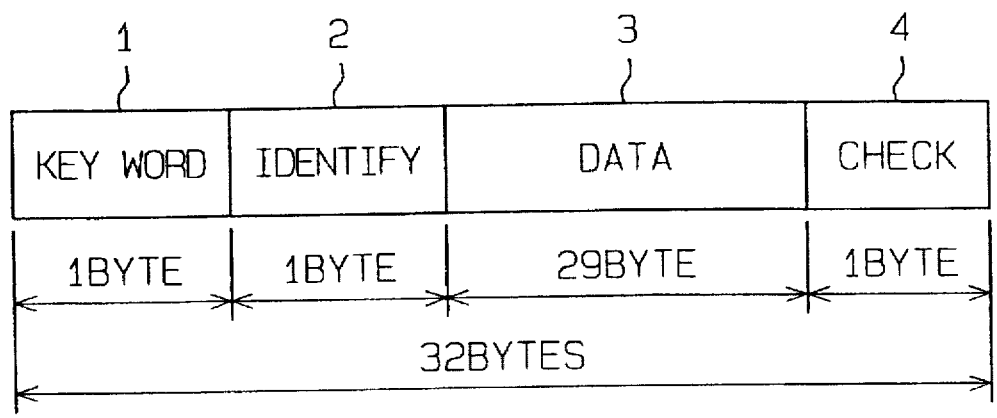
FIG. 2 is a message format.

FIG. 2 shows the message format for communication through data lines B and C. The communication message is made up of 32 bytes, and in sequence from the beginning comprises; a 1 byte key word as the initialization request code, a 1 byte data identifier 2, and 29 bytes of data 3, and a 1 byte check signal 4. The key word is used without using a custom control line, to request to the master, at times when the communication message from the master to the slave is abnormal, to re-perform communication synchronization. The key word is also used to check the synchronization (beginning of message, SOH) between both the master and slave. The data identifier 2 indicates the identity of the data. The data 3 shows the value of the data. The check symbol 4 detects if there is noise in the message or whether the synchronization has deviated.

Figure 3A:
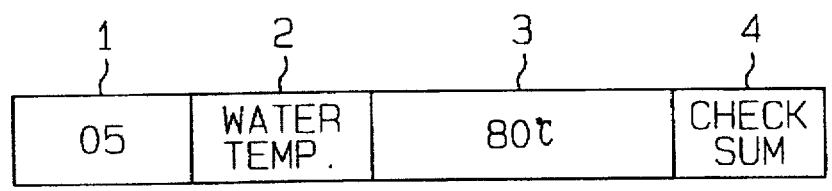
Figure 3B:
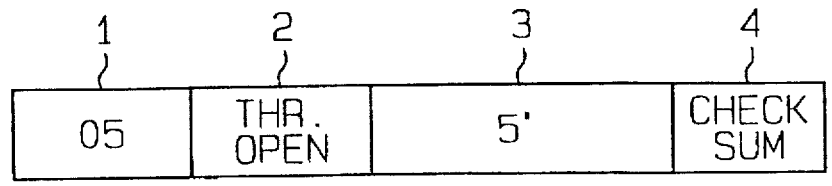

FIGS. 3a and 3b show a specific example of a message format. FIG. 3a shows the message format for water temperature data sent from the master to the slave. During normal operation, the key word 1 is set in the fixed value 05 (hex), regardless of the order of the data contents or message. The data identifier 2 identifies the data as the detected water temperature, and the data 3 indicates the water temperature value. The check symbol 4 utilizes a check sum. FIG. 3b shows the message format for the amount of throttle opening sent from the slave to the master. During normal operation, the key word 1 is set to a fixed value 05 (hex), regardless of the order of the data contents or message. The data identifier 2 identifies the data as the amount of throttle opening and the data 3 shows the value of the detected throttle opening. The check symbol 4 utilizes a check sum.

Figure 4:
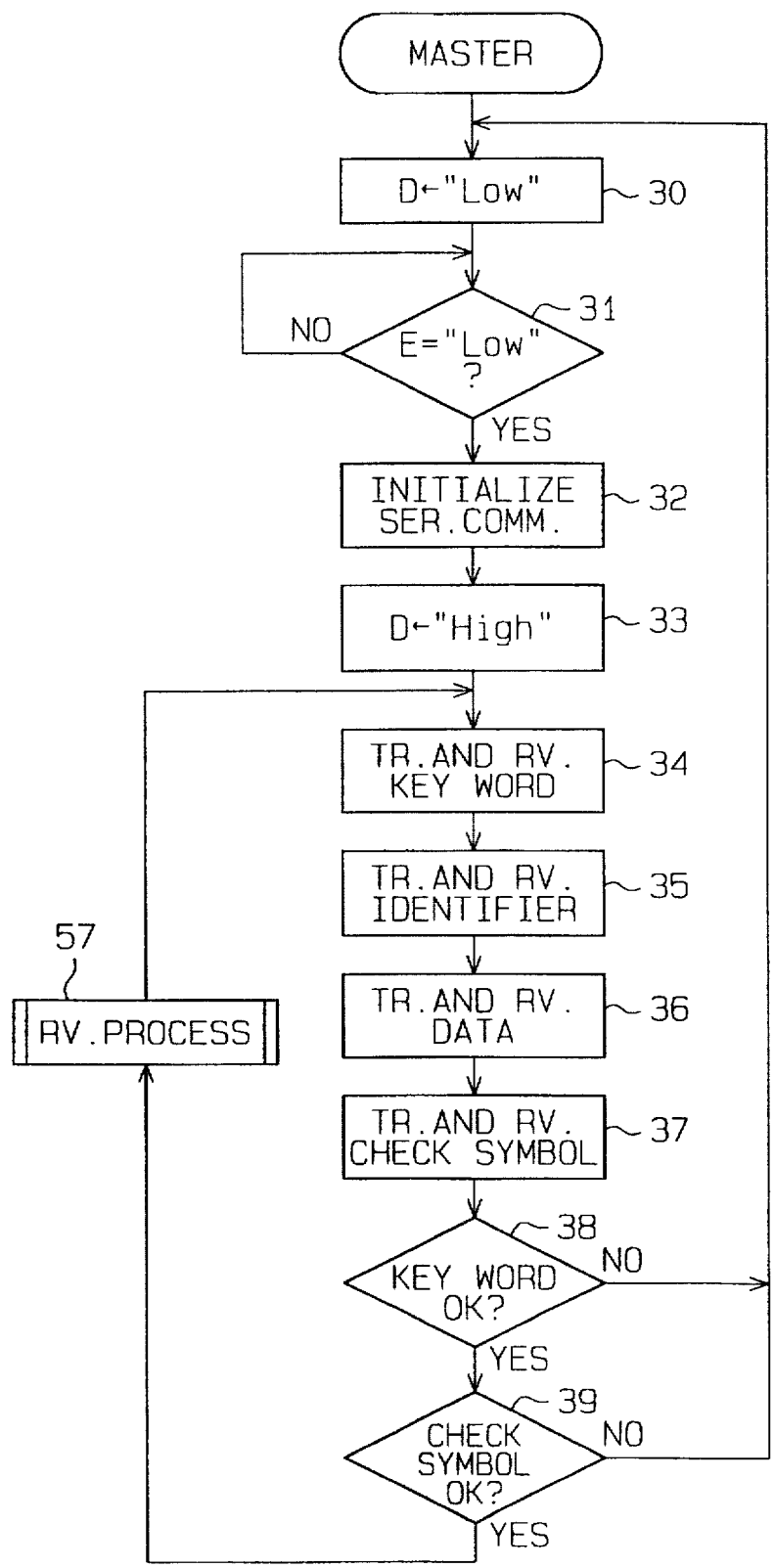
FIG. 4 is a flowchart showing communication processing implemented by a master CPU.
Figure 5:
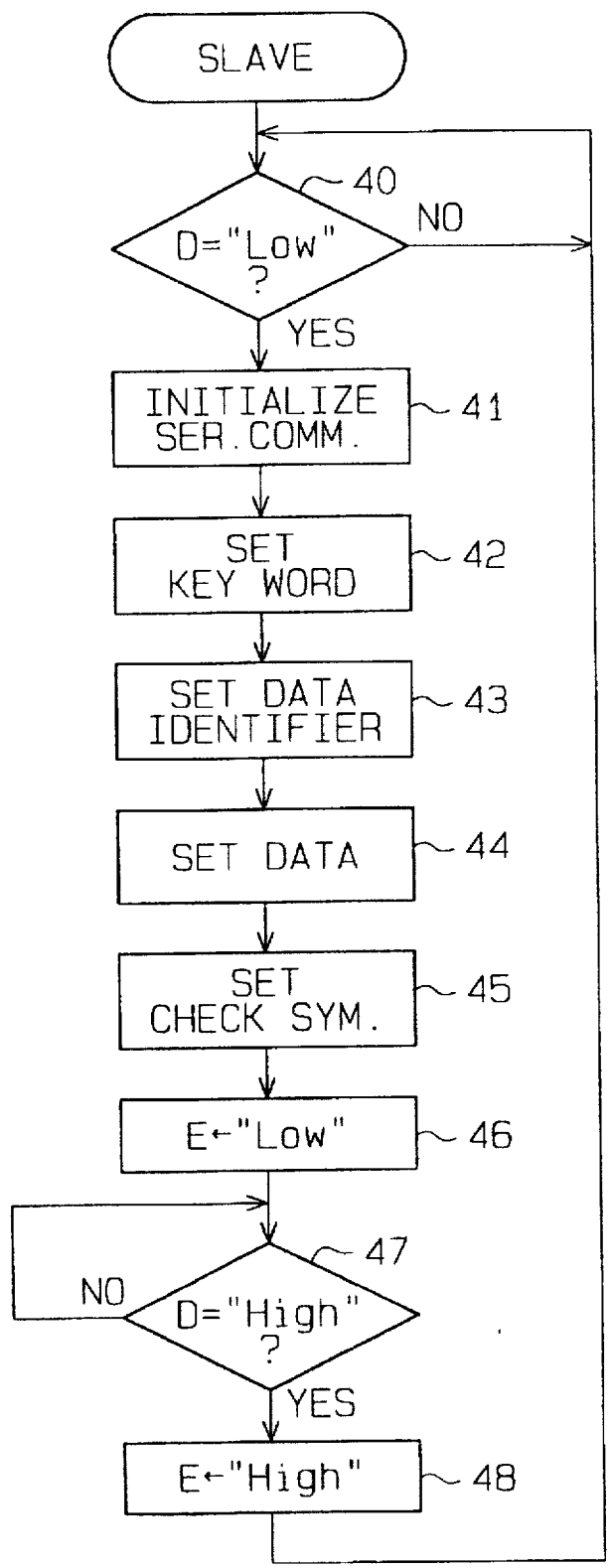
FIG. 5 is a flowchart showing communication processing implemented by a slave CPU.
Figure 6:
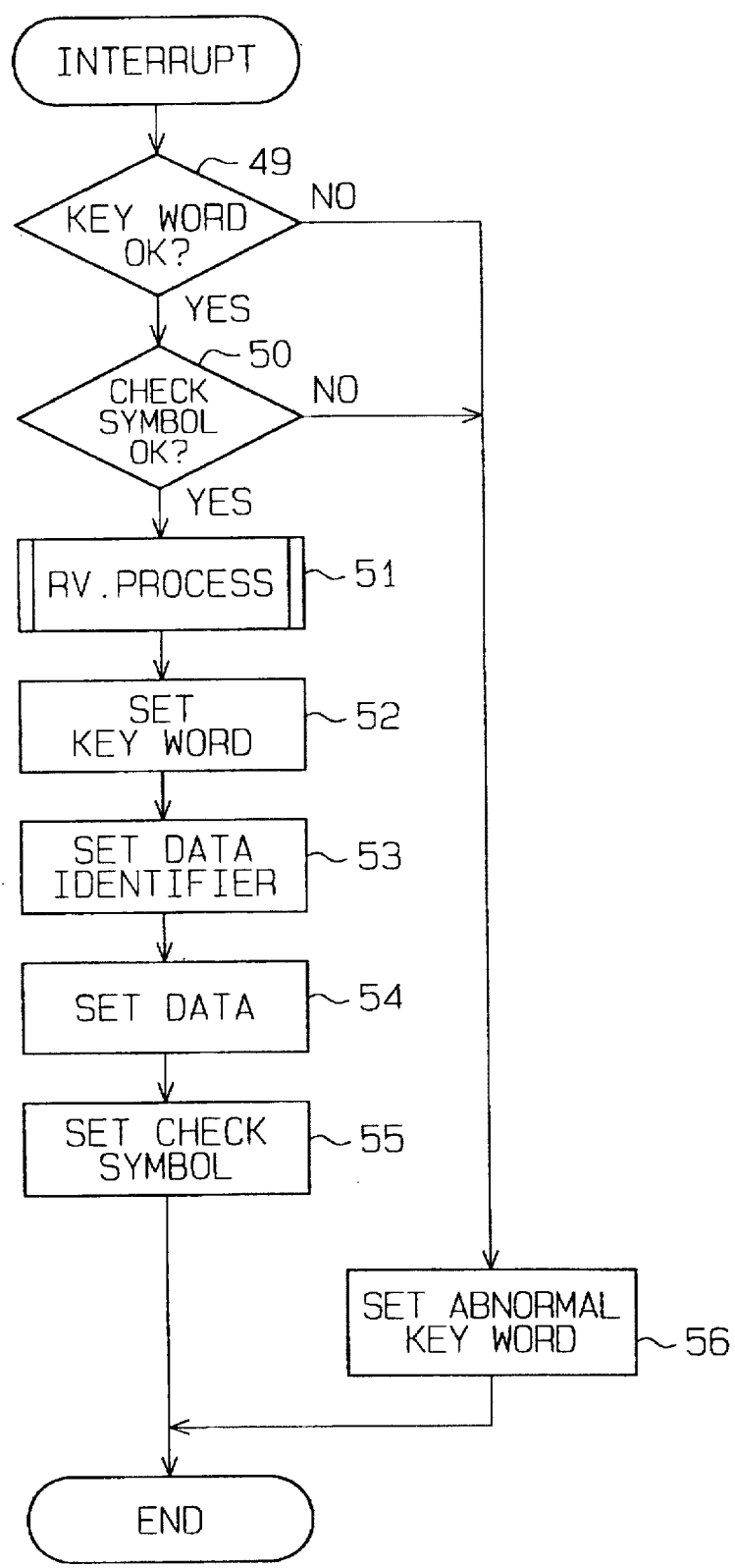
FIG. 6 is a flowchart showing communication processing implemented by a slave CPU.
Figure 10:
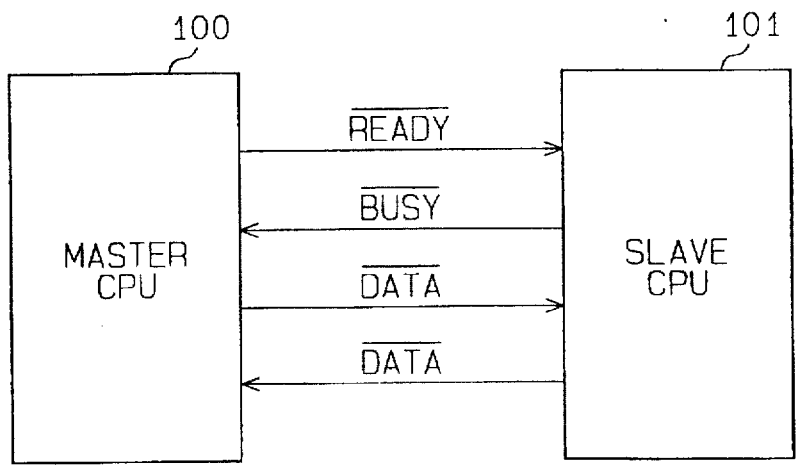
FIG. 10 is block diagram illustrating a prior art.
Figure 11A:
FIGS. 11a through 11c are timing charts illustrating pulse operation in the prior art.
Figure 11B:
Figure 11C:

The function of the communication device is described next for the engine controller thus structured. FIG. 4 is a flow chart showing the communication processing in the master (ECU 10). Steps 34 through 39 are routinely performed transmit/receive message processing. Steps 30 through 33 are the correction processing for communication synchronization when the power is turned on, or when a malfunction is detected. FIG. 5 and FIG. 6 are flow charts showing the communication processing flow in the slave (ECU 20). FIG. 6 is routinely performed transmit/receive message processing which is started by an SPi transmit/receive break-in.

Details of FIGS. 4 through 6 are explained as follows using FIGS. 7a-7e through 9. FIGS. 7a-7e are timing charts for initialization when the power is turned on. Initialization processing is explained by using these figures.

Immediately after reset, the master CPU 16 sets the D line which must be synchronized with the slave CPU 26 upon request, to LOW level (timing t1 in FIG. 7a) in step 30. Afterwards, in step 31 of FIG. 4, the master CPU 16 waits for the E line to be set to LOW level, indicating the synchronization with slave CPU 26 is complete. The slave CPU 26 determines whether or not the D line in step 40 of FIG. 5 is set to LOW level, and upon detecting the LOW level (timing t2 in FIG. 7b) performs initialization in order to achieve synchronization in steps 41 through 45 when there is a synchronization reply from the master CPU 16. More specifically, serial communication processing is performed in step 41, the key word is set in step 42, the data identifier is set in step 43, the data is set in step 44 and the check symbol is set in step 45. The slave CPU 26 sets the E line to LOW level in step 46 to indicate completion of synchronization (timing t3 in FIG. 7b).

Afterwards, when the master CPU 16 in step 31 of FIG. 4 detects that the E line has been set to LOW level, indicating synchronization on the slave side is complete, initialization for the synchronization in step 32 is performed, and in step 33 sets the D line to HIGH level showing that synchronization on the master side is complete (timing t4 in FIG. 7a).

Afterwards, when the slave CPU 26 in step 47 of FIG. 5 detects that the D line has been set to HIGH level, indicating synchronization on the master side is complete, and in step 48 sets the E line to HIGH level (timing t5 in FIG. 7a), the synchronization between the master and slave (CPU) is complete.

Since the slave message has been set (steps 42 through 45 in FIG. 5) after the processing in step 33 of FIG. 4 is complete, the master CPU 16 sends once (and receives) a message to the slave CPU 26 in steps 34 through 37. In other words, the key word is transmitted (TR) and received (RV) in step 34, and the data identifier is sent and received in step 35, and the data is sent and received in step 36, and the check symbol is sent and received in step 37.

The CPU 16 next determines if the key word received in step 38 is the correct value (05 hex) or not, also verifying the received check symbol in step 39, and that the key word is the correct value (05 hex). If the received check symbol is correct, the receive processing is implemented for control based on the received data (throttle opening data stored in RAM 18) in step 57. If the key word is not correct value (05 hex) or the receive check symbol is abnormal, then operation returns to step 30 to re-perform initialization.

Upon an Spi transmit/receive signal interrupt or break-in, the process shown in FIG. 6 commences in the slave CPU 26. The CPU 26 determines in step 49 whether the key word received is the correct value (05 hex) or not, and also verifies the received check symbol in step 50. If the received check symbol is correct, then the receive processing of step 51 is implemented (storage of water temperature data in RAM 28) and the next message is prepared in steps 52 through 55. In other words, the key word is set in step 52, the data identifier is set in step 53, data is set in step 54, and the check symbol is set in step 55. If the CPU 16 has already implemented the transmit/receive processing for the next message (steps 34 through 37 in FIG. 4) during this message preparation time, then operation in FIG. 4 shifts from step 57 back to step 34 to provide sufficient delay time since there is not otherwise sufficient time to transmit and receive the message correctly.

As shown above, after completion of the first synchronization when the power is turned on, if there is no error, communication is performed by means of the processing of steps 34 through 39 in FIG. 4 and the processing in FIG. 6, without utilizing the control lines D and E. Processing time is thus shortened due to a reduced operating time for the control lines D and E and the software load is reduced due to the decrease in the control program. The ROM space needed to store the contents of the E and D line is also reduced.

The processing when a message error occurs is explained next. FIGS. 8a through 8e are timing charts showing the function when an abnormality occurs in the communications message sent from the master CPU 16 to the slave CPU 26. FIGS. 9a through 9e are timing charts showing the line operation, when an abnormality occurs in the communication message sent to the master CPU 16 from the slave CPU 26. An abnormal message here refers to defective messages due to noise or defective messages due to deviations in the synchronization.

FIGS. 8a through 8e are first described. When an abnormal message (ABN) 80 is sent from the master to the slave by data line B, the slave CPU 26 determines an error has occurred by means of the check sum process in step 50 of FIG. 6 and the error is indicated in the key word (ABN KW: value other than 05 hex) appended to message 81 (refer to FIG. 8e) sent by line C. The master CPU 16, in step 38 of FIG. 4, then acknowledges the key word showing the abnormality and starts corrective synchronization processing (step 30). The corrective synchronization timing starts at t10 in FIG. 8a.

Here, only the synchronization processing time of the data is checked by the key word. This time is short compared with control by the custom line (exclusive of data lines).

When an abnormality appears in the message from the master to the slave, the abnormality is indicated in the value in the key word to the master from the slave (value other than 05 hex), and corrective synchronization can now be implemented without having to use a request control line from the master to the slave.

FIGS. 9a through 9e are next described. When an abnormal message 90 is sent from the slave to the master by data line C, the master CPU 16 determines an error has occurred by means of the check sum process in step 39 of FIG. 4, and starts corrective synchronization processing at t11 in the FIG. 9a timing chart.

Thus in this embodiment, the key word (initialization request code) is entered in the communication message from the slave CPU 26 to the master CPU 16, and when a communication error occurs in slave CPU 26 an initialization request is made with the key word from the slave CPU 26 to the master CPU 16, and the master CPU 16 initializes the slave CPU 26 and synchronizes with it through the request line D and reply line E only when the master CPU power is turned on or when a communication error occurs including the request for initialization by means of the key word.

Therefore compared with the method in which a handshake procedure is performed utilizing custom lines to send communication messages to the slave CPU from the master CPU, the frequency of use of custom lines for the handshake procedure can be reduced. As a consequence, the time needed for communication is shortened and the processing load imposed by the handshake procedure can be reduced. In this way, the software processing load can be alleviated and other control software processing delays avoided.

The key word (initialization request code) is placed in the top of the communication message so that the key word will be read out at an early stage of the message and countermeasures taken at an early stage.

This invention need not be limited to the above embodiments, for instance, in the embodiment here, the SPi message could only be set in a plurality of bytes in specific registers, and continuous communication through the hardware then achieved. The message can however, also be set in units of one byte, or more than one byte.

In such cases the communication message is segmented and sent in units longer than the number of bits making up the key word (initialization request code). In the master CPU, the initialization request is detected when the key word is received and a countermeasure then taken at an early stage. There is thus no need for error detection with a check symbol appended at the end of the message, and quick recovery from an error is possible because error detection is performed before transmission of communication data. Communication processing of the message data is unnecessary and along with shortening recovery time when an error occurs, the software processing load can be reduced. Further benefits are that high speed processing is possible and the arithmetic processing of the check symbol is eliminated.

This invention as explained above, provides superior benefits in that along with reducing the frequency of use of custom lines for the handshake procedure and shortening communication time, it also reduces the processing load imposed by the handshake procedure.

Another advantage is that the initialization request code is read out at an early stage so early stage countermeasures can be taken. A still further benefit is that the initialization request is detected when the initialization request code is received so that countermeasures can be taken at an early stage.

What is claimed is:

1. A communication device for performing synchronized serial communication between a master CPU and a slave CPU, the device comprising:

a first data line for sending a first communication message from the master CPU to the slave CPU;

a second data line for sending a second communication message from the slave CPU to the master CPU;

a request line for requesting initialization from the master CPU to the slave CPU; and a reply line for indicating completion of initialization from the slave CPU to the master CPU, wherein:

a request for initialization from the slave CPU to the master CPU, when a communication error is detected in the slave CPU, is made by means of an initialization request code inserted in the second communication message from the slave CPU to the master CPU sent over the second data line, and the master CPU initializes the slave CPU and synchronizes therewith through the request line and the reply line only when one of power is turned on and the communication error occurs, the communication error being indicated by the request for initialization by means of the initialization request code.

2. A communication device of claim 1, wherein the initialization request code is inserted at a beginning of the second communication message.

3. A communication device of claim 1, wherein the master CPU and the slave CPU use only the first and the second data lines for normal transmission of the first and the second communication messages during an absence of the communication error.

4. A communication device for performing synchronized serial communication between a master CPU and a slave CPU, the device comprising:

a first data line for sending a first communication message from the master CPU to the slave CPU;

a second data line for sending a second communication message from the slave CPU to the master CPU;

a request line for requesting initialization from the master CPU to the slave CPU; and a reply line for indicating completion of initialization from the slave CPU to the master CPU, wherein:

a request for initialization from the slave CPU to the master CPU, when a communication error is detected in the slave CPU, is made by means of an initialization request code inserted at a beginning of the second communication message from the slave CPU to the master CPU sent over the second data line, the master CPU initializes the slave CPU and synchronizes therewith through the request line and the reply line only when one of power is turned on and the communication error occurs, the communication error being indicated by the request for initialization by means of the initialization request code in the second communication message, and the second communication message is segmented and sent to the master CPU in units longer than a number of bits composing the initialization request code.

5. A communication device for performing synchronized serial communication between a master CPU and a slave CPU, the device comprising:

a first data line for sending a first communication message from the master CPU to the slave CPU;

a second data line for sending a second communication message from the slave CPU to the master CPU;

a request line for requesting initialization from the master CPU to the slave CPU; and a reply line for indicating completion of initialization from the slave CPU to the master CPU, wherein:

upon a communication error detected in the slave CPU, a request for initialization from the slave CPU to the master CPU is made by means of an initialization request code inserted in the second communication message from the slave CPU to the master CPU sent over the second data line, and the master CPU initializes the slave CPU and synchronizes therewith when the communication error is indicated by the request for initialization by means of the initialization request code.

6. A communication device of claim 5, wherein:

the master CPU requests initialization to the slave CPU through the request line and, the slave CPU indicates the completion of the initialization to the master CPU through the reply line after the initialization of the slave CPU.

7. A communication device of claim 5, wherein:

the first communication message is segmented into a predetermined data length and sent in at least one segment, each segment being the predetermined data length and, wherein said slave CPU determines the communication error when the first communication message received from the main CPU has a length other than the predetermined data length.

8. A communication device of claim 5, wherein the master CPU and the slave CPU use only the first and the second data lines for normal transmission of the first and the second communication messages during an absence of the communication error.

9. A communication method for performing a synchronized serial communication between CPUs, the method comprising steps of:

sending a first communication message through a first data line from a first CPU to a second CPU;

sending a second communication message through a second data line from the second CPU to the first CPU;

requesting an initialization through a request line from the first CPU to the second CPU;

replying upon a completion of the initialization through a reply line from the second CPU to the first CPU;

inserting an initialization request code into the second communication message when a communication error is detected in the second CPU; and initializing and synchronizing the second CPU by the first CPU through the request line and the reply line in response to the initialization request code inserted into the second communication message.

10. A communication method of claim 9, wherein:

the second communication message has a predetermined format including a key word and data, and the step of inserting the initialization request code into the second communication message includes changing the key word in the second communication message to the initialization request code.

11. A communication method of claim 10, wherein:

during an absence of the communication error, only the steps of sending the first communication message and sending the second communication message are performed.

12. A communication method of claim 9, wherein:

the steps of requesting the initialization through the request line and replying upon the completion of the initialization through the reply line are performed only when one of power is turned on and the communication error through one of the first data line and the second data line occurs.

13. A communication device for performing synchronized serial communication between a master CPU and a slave CPU, the device comprising:

a first data line for sending a first communication message from the master CPU to the slave CPU;

a second data line for sending a second communication message from the slave CPU to the master CPU;

a request line for requesting initialization from the master CPU to the slave CPU; and a reply line for indicating completion of initialization from the slave CPU to the master CPU, wherein:

the second communication message has a predetermined format including a key word as well as data to be sent, the key word of the second communication message sent over the second data line is changed to an initialization request code when an initialization is requested from the slave CPU to the master CPU, and the master CPU initializes the slave CPU and synchronizes therewith through the request line and the reply line when the initialization request code in the second communication message is received through the second communication line.

14. A communication device of claim 13, wherein:

the second communication message is segmented in units longer than a number of bits composing the initialization request code and is sent one segment at a time.

15. A communication device of claim 14, wherein:

the initialization request code is inserted at a beginning of the second communication message.

16. A communication device of claim 13, wherein:

the master CPU and the slave CPU use only the first and the second data lines for normal transmission of the first and the second communication messages when the initialization request code is absent from the second communication message.

17. A communication device of claim 13, wherein:

the master CPU and the slave CPU use the request line and the reply line only when one of power is turned on and a communication error through one of the first and the second data lines occurs.

* * * * *